(12) United States Patent
Bunnell et al.

(10) Patent No.: US 11,211,803 B2
(45) Date of Patent: Dec. 28, 2021

(54) METHOD AND APPARATUS FOR BATTERY CELL CHARGE BALANCING

(71) Applicant: GM GLOBAL TECHNOLOGY OPERATIONS LLC, Detroit, MI (US)

(72) Inventors: Justin Bunnell, Northville, MI (US); Garrett M. Seeman, Novi, MI (US); Joseph Cho, Waterford Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 16/589,586

(22) Filed: Oct. 1, 2019

(65) Prior Publication Data
US 2021/0098997 A1 Apr. 1, 2021

(51) Int. Cl.
*H02J 7/00* (2006.01)
*B60L 58/22* (2019.01)
*B60L 58/13* (2019.01)
*H01M 10/44* (2006.01)

(52) U.S. Cl.
CPC ............ *H02J 7/0014* (2013.01); *B60L 58/13* (2019.02); *B60L 58/22* (2019.02); *H02J 7/0048* (2020.01); *H02J 7/00712* (2020.01); *H01M 10/441* (2013.01); *H02J 7/0016* (2013.01); *H02J 7/0019* (2013.01)

(58) Field of Classification Search
CPC .... H02J 7/0014; H02J 7/00712; H02J 7/0048; B60L 58/13; B60L 58/22
USPC ......................................................... 320/116
See application file for complete search history.

(56) References Cited

U.S. PATENT DOCUMENTS

| | | | |
|---|---|---|---|
| 9,236,749 B2 | 1/2016 | Gibbs et al. | |
| 9,713,014 B2 * | 7/2017 | Uchiyama | H04W 16/18 |
| 10,044,069 B2 * | 8/2018 | Despesse | H01M 10/486 |
| 10,391,864 B2 * | 8/2019 | Patel | B60L 3/0046 |
| 10,673,263 B2 * | 6/2020 | Nakao | B60L 50/66 |
| 11,052,783 B2 * | 7/2021 | Gibbs | B60L 58/12 |
| 2009/0131055 A1 * | 5/2009 | Wang | H04W 36/0055 455/436 |
| 2014/0015488 A1 * | 1/2014 | Despesse | B60L 58/12 320/122 |
| 2014/0300323 A1 * | 10/2014 | Gibbs | H02J 7/0014 320/116 |

(Continued)

*Primary Examiner* — John T Trischler
(74) *Attorney, Agent, or Firm* — Quinn IP Law (57) ABSTRACT

A system and associated method are described for balancing an electrical parameter associated with stored electric power in a multi-cell battery. A cell charge balancing system determines a first plurality of the electrical parameters associated with respective ones of the plurality of cells, a plurality of first charge parameters associated with the cells, and a first quality index. A second plurality of the electrical parameters are determined, and second charge parameters are determined to determine a second quality index. The first and second quality indices are compared, and a cell charge balancing routine controls the balancing system based upon the first quality index when the first quality index is greater than the second quality index. The cell charge balancing routine controls the cell charge balancing system based upon the second quality index when the first quality index is less than the second quality index.

17 Claims, 3 Drawing Sheets

(56) References Cited

U.S. PATENT DOCUMENTS

| | | | |
|---|---|---|---|
| 2015/0358831 A1* | 12/2015 | Uchiyama | H04W 16/32 |
| | | | 455/446 |
| 2018/0109120 A1* | 4/2018 | Nakao | H02J 7/008 |
| 2018/0222345 A1* | 8/2018 | Patel | B60L 58/10 |
| 2019/0148963 A1* | 5/2019 | Nakao | H02J 7/00712 |
| | | | 320/134 |
| 2020/0247268 A1* | 8/2020 | Aoyama | B60L 58/13 |
| 2021/0028511 A1* | 1/2021 | Clarke | H01M 10/48 |
| 2021/0091587 A1* | 3/2021 | Nakao | H02J 7/0024 |
| 2021/0215768 A1* | 7/2021 | Zhang | G01R 31/3842 |
| 2021/0245622 A1* | 8/2021 | Wang | H02J 7/00309 |

\* cited by examiner

METHOD AND APPARATUS FOR BATTERY CELL CHARGE BALANCING

INTRODUCTION

Batteries are electrochemical devices that may include multiple cells that are electrically interconnected to provide electric power to a device, such as an electric machine. In use, battery cells may develop different electrical characteristics that may be quantified in terms of charge capacities, states of charge, discharge rates, impedances, and/or voltages. Furthermore, one or more of the cells of a battery may be replaced and/or added in-use, resulting in different capacities, states of charge, discharge rates, impedances, and/or voltages between the new battery cell and the existing battery cells. Imbalance in electrical characteristics between battery cells may affect in-use performance characteristics and service life of a multi-cell battery. Properly balancing battery cells may prevent overcharging and/or undercharging of individual cells and may maximize usable battery energy.

Vehicles may include one or multiple batteries for operating a vehicle's electrical and/or drivetrain systems. For example, a vehicle may include a 12V lead-acid automotive battery configured to supply electric energy to vehicle starter systems (e.g., a starter motor), lighting systems, and/or ignition systems. Furthermore, electric vehicles and hybrid vehicles may include a high-voltage battery to provide power to electric drivetrain components such as electric drive motors.

Long periods of battery rest time, i.e., periods of operation at low or no current, may be required to determine amounts of charge that are to be removed from cells having high levels of state of charge to achieve a balanced state in the battery. A vehicle operating in an autonomous mode may be operating continuously, making occurrence of long periods of rest time unlikely. There may be a need to evaluate in-process cell charge balancing calculations in order to ensure that the most accurate information is employed in cell balancing in the battery.

SUMMARY

A system and associated method are described for balancing an electrical parameter associated with stored electric power in a battery that includes a plurality of cells. A plurality of sensors are coupled to the plurality of cells, wherein each of the sensors is arranged to determine an electrical parameter associated with the respective cell. A cell charge balancing system is coupled to the plurality of cells, wherein the cell charge balancing system is arranged to control an amount of energy stored in each of the plurality of cells. A battery controller is in communication with the plurality of sensors and the cell charge balancing system and includes an instruction set that is executable to determine, at a first timepoint, a first plurality of the electrical parameters associated with respective ones of the plurality of cells, determine a plurality of first charge parameters associated with the plurality of cells based upon the respective first plurality of electrical parameters, and determine a first quality index based upon the plurality of first charge parameters. The instruction set is further executable to determine, at a second timepoint subsequent to the first timepoint, a second plurality of the electrical parameters associated with respective ones of the plurality of cells, determine a plurality of second charge parameters associated with the plurality of cells based upon the respective second plurality of electrical parameters, and determine a second quality index based upon the plurality of second charge parameters. The first and second quality indices are compared, and a cell charge balancing routine is executed to control the balancing system based upon the first quality index when the first quality index is greater than the second quality index. The cell charge balancing routine is also executed to control the cell charge balancing system based upon the second quality index when the first quality index is less than the second quality index.

Another aspect of the disclosure includes the instruction set executable to determine the first plurality of the electrical parameters during one of a rested state, a low current state, or at a charge complete condition at the first timepoint.

Another aspect of the disclosure includes the instruction set executable to determine an open circuit time quality index associated with the first plurality of the electrical parameters during the rested state, a low current quality index associated with the first plurality of the electrical parameters during the low current state, and a charge complete event quality index associated with the first plurality of the electrical parameters at the charge complete event; and select a maximum of the open circuit time quality index, the low current quality index, and the charge complete event quality index as the first quality index.

Another aspect of the disclosure includes the instruction set executable to determine the second plurality of the electrical parameters during one of a rested state, a low current state, or at a charge complete condition at the second timepoint.

Another aspect of the disclosure includes the instruction set executable to determine an open circuit time quality index associated with the second plurality of the electrical parameters during the rested state, a low current quality index associated with the second plurality of the electrical parameters during the low current state, and a charge complete event quality index associated with the second plurality of the electrical parameters at the charge complete event; and select a maximum of the open circuit time quality index, the low current quality index, and the charge complete event quality index as the second quality index.

Another aspect of the disclosure includes the instruction set executable to subject the first quality index subject to a decay parameter based upon a difference between the first and second timepoints.

Another aspect of the disclosure includes the instruction set executable to selectively charge individual ones of the cells, discharge individual ones of the cells, and redistribute energy between individual ones of the cells to achieve equivalent charge balance points in all of the cells.

Another aspect of the disclosure includes the equivalent charge balance points being either a state of charge or a voltage level.

Another aspect of the disclosure includes a system including a battery including a plurality of cells, a plurality of sensors coupled to the plurality of cells, wherein each of the sensors is arranged to determine an electrical parameter associated with the respective cell, a cell charge balancing system coupled to the plurality of cells and arranged to control an amount of energy stored in each of the plurality of cells, and a battery controller in communication with the plurality of sensors and the cell charge balancing system. The battery controller includes an instruction set that is executable to determine, at a first timepoint, a first quality index based upon a plurality of first charge parameters associated with the plurality of cells that are based upon a respective first plurality of electrical parameters, and determine, at a second timepoint subsequent to the first timepoint, a second quality index based upon a plurality of second charge parameters associated with the plurality of cells that are based upon a respective second plurality of electrical parameters. A cell spread is determined based upon the plurality of second charge parameters associated with the plurality of cells that are based upon the respective second plurality of electrical parameters. A cell spread threshold is determined based upon the second quality index. A cell charge balancing routine is executed to control the balancing system based upon the second quality index only when the second quality index is greater than the first quality index, and the cell spread is greater than the cell spread threshold.

Another aspect of the disclosure includes the instruction set executable to execute the cell charge balancing routine to control the balancing system based upon the first quality index when the second quality index is less than the first quality index.

Another aspect of the disclosure includes the instruction set executable to execute the cell charge balancing routine to control the balancing system based upon the first quality index when the cell spread is less than the cell spread threshold.

As such, a cell balancing system may be coupled to a multi-cell battery to selectively charge individual cells, discharge individual cells, and/or redistribute energy between the cells to achieve equivalent charge balance points in all of the cells, wherein the desired balance point may be in the form of a state of charge. This allows multiple events of varying battery conditions to trigger a new cell balancing assessment. A quality index can be determined based upon the new cell balancing assessment, and represents a confidence in achieving a balanced pack from that cell balancing determination. The new quality index can be compared to a present, in-process cell balance quality index, and existing/in-process cell balancing calculations are replaced if the new quality index is of higher quality. This allows multiple types of events to trigger a cell balancing event.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 4-1 through 4-6 graphically show quality indices in relation to corresponding parameters, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As used herein, the term "system" may refer to a combination or collection of mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory to contain software or firmware instructions, a combinational logic circuit, and/or other components that provide the described functionality.

Figure 1:
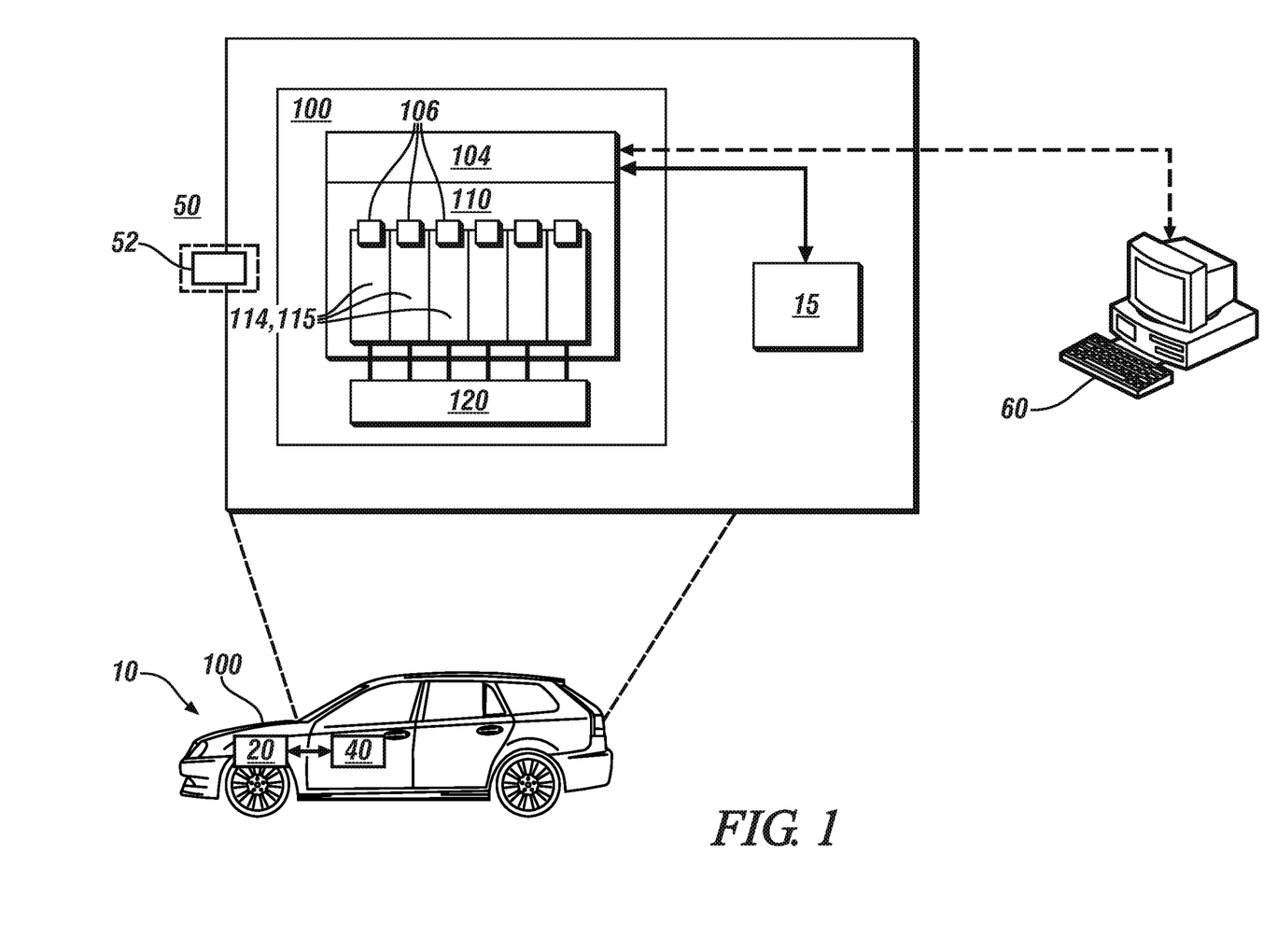
FIG. 1 schematically shows a vehicle and associated battery system, in accordance with the disclosure.

Referring to the drawings, wherein like reference numerals correspond to like or similar components throughout the several Figures, FIG. 1 illustrates a vehicle 10 that includes a drivetrain 20 and a battery system 100 that is illustrative of the concepts described herein. Overarching operation of the vehicle 10 is controlled by a vehicle controller 15. In one embodiment, the vehicle 10 also includes an autonomic vehicle control system 40. Alternatively, the vehicle 10 may be configured as a non-autonomous vehicle that employs an embodiment of the battery system 100. The vehicle 10 includes, in one embodiment, a four-wheel passenger vehicle with steerable front wheels and fixed rear wheels. The vehicle 10 may include, by way of non-limiting examples, a passenger vehicle, a light-duty or heavy-duty truck, a utility vehicle, an agricultural vehicle, an industrial/warehouse vehicle, a recreational off-road vehicle, an airplane, or a marine vehicle.

The drivetrain 20 of the vehicle 10 may be configured as an electric vehicle (EV), a hybrid vehicle (HV) that includes an internal combustion engine ("ICE"), or another configuration that incorporates the systems and methods disclosed herein. The battery system 100 may be employed to supply electric power to electrical components of the drivetrain 20.

The autonomic vehicle control system 40 includes an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle. Driving automation can include some level of automatic control or intervention related to simultaneous control of multiple vehicle functions, such as steering, acceleration, and/or braking, with the driver continuously having overall control of the vehicle. Driving automation can include simultaneous automatic control of all vehicle driving functions, including steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle for an entire trip. Driving automation includes hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like.

The vehicle 10 includes an electrical charging system 50 for electrically charging battery cells 115 of the battery system 100. The electrical charging system 50 includes, in one embodiment, a charger 52 that is electrically couplable to an off-vehicle electrical power supply (not shown) that may be available at a public or private charging station. The electrical power supply may be arranged to supply electrical power to charge the battery system 100 via the electrical charging system 50. The supplied electrical power may be in the form of AC power or DC power.

The battery system 100 includes, in one embodiment, a battery pack 110, a battery pack controller 104, a plurality of sensors 106, and a cell balancing system 120. The battery pack 110 may be arranged as a multi-cell high-voltage battery system including a plurality of the battery cells 115 that are electrically connected in series or in parallel to provide electrical power to an actuator, such as an electric machine. The battery cells 115 may be arranged in one or more battery sections 114 that are sized to provide electrical power at a desired voltage and a desired current to a system of the vehicle 10, e.g., the drivetrain 20. Each of the battery cells 115 may employ rechargeable electrochemical battery technology including, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other battery technologies.

The sensors 106 are arranged to measure electrical parameters associated with the battery cells 115. In one embodiment, each of the sensors 106 is a voltmeter or an ammeter. Individual ones of the sensors 106 may be associated with each of the battery cells, or with each of the battery sections 114. State of charge information may be determined based upon the measured electrical parameters from the sensors 106. The determined state of charge may be provided to the battery pack controller 104. Using the state of charge information, the battery pack controller 104 may operate to coordinate battery balancing operations.

Each of the battery cells 115 or battery sections 114 may be in communication with a cell balancing system 120. The cell balancing system 120 may include a network of switches and/or gates that are configured to facilitate selective electrical energy transfer to, from, and/or between the battery cells 115. The cell balancing system 120 may balance the battery cells 115 of the battery pack 110 by charging individual ones of the battery cells 115 and/or discharging individual ones of the battery cells 115, such that each of the battery cells 115 has the same or similar quantum of energy stored therein, as indicated by a state of charge measurement or a voltage measurement.

The battery system 100 includes the battery pack controller 104, which may be configured to monitor and control certain operations of the battery system 100. For example, the battery pack controller 104 may be configured to monitor information from the plurality of sensors 106 and control operations of the electrical charging system 50 and the cell balancing system 120 to control charging, discharging, and/or balancing operations of the battery system 100. The battery pack controller 104 may further be configured to provide information to and/or receive information from other systems included in the vehicle 10. For example, the battery pack controller 104 may be communicatively coupled with the vehicle controller 15 and/or a remotely located external computer system 60 via a telematics system (not shown). In certain embodiments, the battery pack controller 104 may be configured, at least in part, to provide information regarding the battery system 100 to a user of the vehicle 10, the vehicle controller 15, and/or the external computer system 60. Such information may include, for example, battery state of charge information, battery operating time information, battery operating temperature information, and/or other information regarding the battery system 100.

In certain embodiments, a cell charge balancing operation may be performed upon startup of the vehicle 10. In other embodiments, a cell charge balancing operation may be performed when the vehicle 10 and/or battery system 100 are not in use. In further embodiments, a cell charge balancing operation may be performed upon the installation of a new battery cell 115 and/or the replacement of an old battery cell 115. Battery cells 115 of the battery pack 110 are said to be balanced, or in a balanced state when the estimated states of charge and/or the calculated quanta of energy are within an allowable range of error.

Cell charge balancing may begin by determining states of charge of each of the battery cells 115. Voltages of each of the battery cells 115 may be employed as indicators of the states of charge. A quantum of energy to reach a desired state of charge balance point for the battery system may be calculated for each of the plurality of sections. In certain embodiments, a quantum of energy may be expressed in terms of ampere-hours ("AHr") required to reach the desired state of charge balance point. Based on the estimated states of charge and/or the calculated quanta of energy, it may be determined that the battery cells 115 are either balanced or unbalanced. For example, if the estimated states of charge and/or the calculated quanta of energy are equivalent, within an allowable range of error, it may be determined that the battery cells 115 are balanced. If the battery cells 115 are balanced, cell charge balancing operations may not be required. If, however, the battery cells 115 are unbalanced, balancing operations may proceed.

By way of example, one or more battery cells 115 may be identified having calculated quanta of energy (e.g., calculated in terms of AHr) required to reach the desired state of charge balance point that is different (e.g., greater or smaller) than other battery sections. For example, in a battery system 100 having three battery cells 115, a first cell and a second cell may be associated with the same quantum of energy required to reach a desired balance point (e.g., 20 AHr). A third cell may be associated with a smaller quantum of energy required to reach the desired balance point (e.g., 15 AHr). The third cell may be discharged (e.g., by 5 AHr) so that all three battery cells 115 require the same quantum of energy (e.g., 20 AHr) to reach a desired state of charge balancing point. In this manner, upon charging the battery system to the desired state of charge balancing point (e.g., a charge termination level), all cells of the battery system will be at or near the balancing point and the battery system will be balanced.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
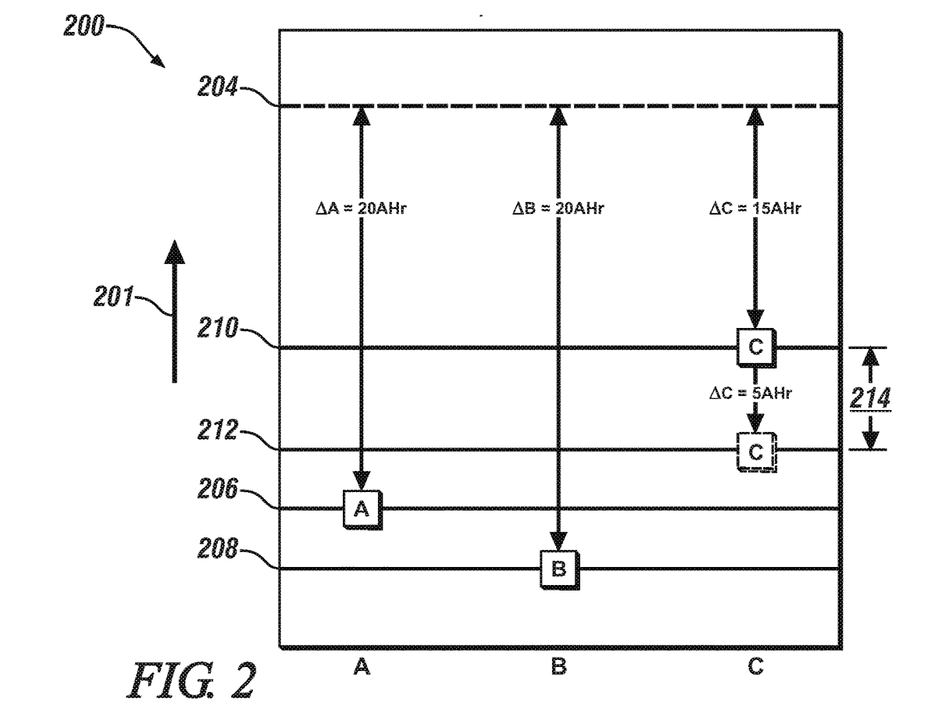
FIG. 2 graphically shows data associated with individual cell voltages, in accordance with the disclosure.

FIG. 2 is a conceptual graph illustrating methods for balancing a battery system consistent with embodiments disclosed herein, and graphically shows voltage data associated with individual battery cells 115, numbered as cells 1-7, for an embodiment of the battery pack 110 that is described with reference to FIG. 1. A target open-circuit voltage (OCV) 212, an actual OCV 210, and a voltage reduction 214 are indicated for each of the battery cells 1-7. The voltage data 201 is an example of a battery assessment that may be employed by a cell charge balancing routine 320, as described with reference to FIG. 3. The graph of FIG. 2 illustrates a state of charge window representing varied states of charge 200 for a plurality of battery cells 202 (e.g., cells A, B and C) under three different states of charge conditions. For example, Cell A may have a first state of charge 206, Cell B may have a second state of charge 208, and Cell C may have a third state of charge 212.

A quantum of energy to reach a desired state of charge balance point 204 for the battery system may be calculated for each of the battery cells 202. In certain embodiments, a quantum of energy may be expressed in terms of ampere-hours ("AHr") required to reach the desired state of charge balance point 204 that, in certain embodiments, may be a charge termination level for the battery system. For example, as illustrated, Cell A may be associated with a quantum of energy ($\Delta A$) of 20 AHr, Cell B may be associated with a quantum of energy ($\Delta B$) of 20 AHr, and Cell C may be associated with a quantum of energy ($\Delta C$) of 15 AHr. In certain, embodiments, two or more of the cells may require the same quanta of energy to reach the state of charge balance point 204 but nevertheless have different associated states of charge due to different cell capacities, e.g., Cells A and Cell B. In further embodiments, cells having the same states of charges may be associated with the same quanta of energy to reach to the state of charge balance point 204.

Based on the states of charge 206-210 and/or the calculated quanta of energy, e.g., $\Delta A$, $\Delta B$, and $\Delta C$, it may be determined that the battery cells 202 are either balanced or unbalanced. For example, if the estimated states of charge 206-210 and/or the calculated quanta of energy are equivalent, within a predefined range, it may be determined that that the battery cells 202 are balanced. If the battery cells 202 are balanced, balancing operations may not be required. If, however, the battery cells 202 are unbalanced, as illustrated in FIG. 2, balancing operations may proceed. One or more battery cells may be identified having calculated quanta of energy required to reach the desired state of charge balance point 204 that are different, e.g., greater or less than other battery cells. For example, as illustrated, Cell C may have an associated quantum of energy, e.g., $\Delta C=15$ AHr, that is different that the quanta of energy associated with Cell A and Cell B, e.g., $\Delta A$. and $\Delta B$ being approximately 20 AHr. Cell A, Cell B, and/or Cell C may then be charged and or discharged such that the quanta of energy associated with the cells are the same or similar, e.g., $\Delta A$ and. $\Delta B$ being approximately equal to $\Delta C$, e.g., 20 AHr. For example, as illustrated, Cell C may be discharged by a quantum of energy ($\Delta C$) of 5 AHr to state of charge level 212 such that the quanta of energy associated with the cells are the same or similar, e.g., $\Delta A$ being approximately equal to $\Delta B$ being approximately equal to $\Delta C$, which is approximately equal to 20 AHr. In this manner, upon charging the battery system to the desired state of charge balancing point 204, all cells 202 of the battery system will be at or near the balancing point 204 and the battery system will be balanced.

Figure 3:
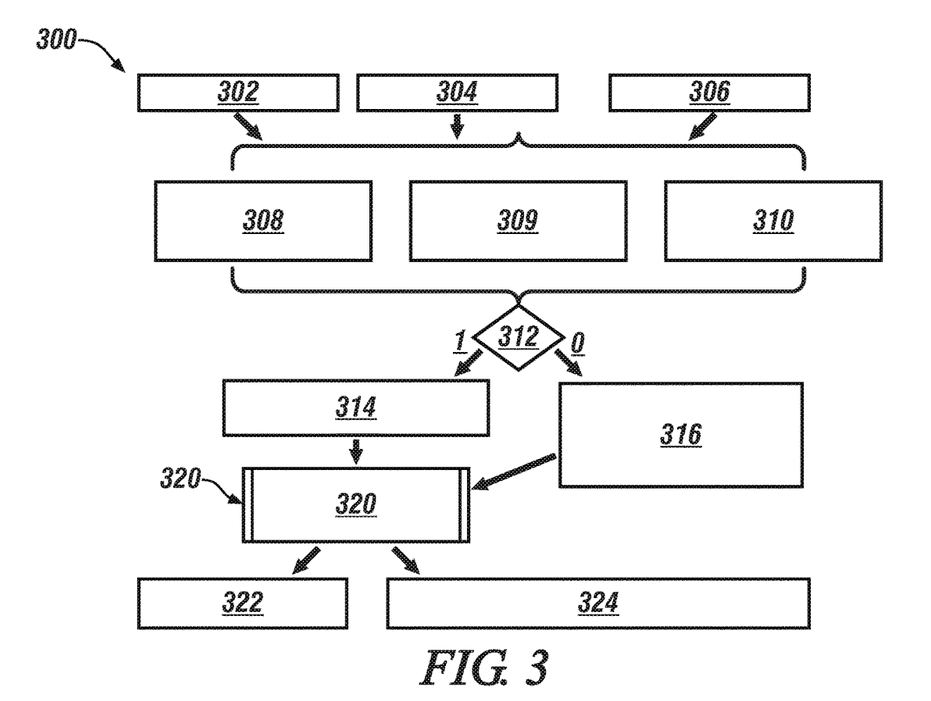
FIG. 3 schematically shows, in flowchart form, a process for executing a charge balancing routine based upon first and second quality indices, in accordance with the disclosure.

Referring now to FIG. 3, with continued reference to the battery system 100 that is described with reference to FIG. 1, a cell charge balancing control routine 300 is schematically illustrated. The cell charge balancing control routine 300 may be executed by the battery pack controller 104 to monitor the battery pack 110 via the plurality of sensors 106, and control operation of the cell balancing system 120 to effect cell charge balancing in the battery pack 110. The cell charge balancing control routine 300 is illustrated as a collection of blocks in a logical flow graph, which represents a sequence of operations that can be implemented in hardware, software, firmware, or a combination thereof that have been configured to perform the specific functions. In the context of software, the blocks represent computer instructions that, when executed by one or more processors, perform the recited operations. During operation of the vehicle 10, the battery pack controller 104 monitors the sensors 106 associated with each of the battery cells 115 of the battery pack 110 and periodically communicates with the electrical charging system 50 to perform a battery assessment that may be employed by a cell charge balancing routine 320.

The battery pack controller 104 may be triggered to perform a battery assessment that may be employed by the cell charge balancing routine 320 when the battery pack 110 has achieved a rested state (302). A rested state for the battery pack 110 may be defined as the battery pack 110 being at a zero-current state for an extended period of time, e.g., greater than 4 hours. When the battery pack 110 has achieved the rested state, electrical parameters for each of the battery cells 115 may be determined employing the plurality of sensors 106.

The battery pack controller 104 may be triggered to perform a battery assessment that may be employed by the cell charge balancing routine 320 when the battery is being operated at a low current state (304). A low current state for the battery pack 110 may be defined as the battery pack 110 being at a current level that is less than 10 amps for an extended period of time, e.g., greater than 0.5 hours. When the battery pack 110 has achieved the low-current state, electrical parameters for each of the battery cells 115 may be determined employing the plurality of sensors 106.

The battery pack controller 104 may be triggered to perform a battery assessment that may be employed by the cell charge balancing routine 320 when the battery pack 110 is at a charge complete state (306). A charge complete state for the battery pack 110 may be defined as occurring immediately subsequent to discontinuation or an end of a charging event for the battery pack 110, and may include the battery pack 110 being fully charged, or the battery pack 110 being partially charged. When the battery pack 110 has achieved the charge complete state, electrical parameters for each of the battery cells 115 may be determined employing the plurality of sensors 106.

When one of the aforementioned conditions (302, 304, 306) triggers the battery pack controller 104 to perform a battery assessment for potential use by the cell charge balancing routine 320, the electrical parameters for each of the battery cells 115 may be captured and determined employing the plurality of sensors 106. In one embodiment, and as described with reference to FIG. 2, the electrical parameters for each of the battery cells 115 may be in the form of a voltage for each of the battery cells 115. Furthermore, a temperature of the battery pack 110 may be determined.

The cell charge balancing control routine 300 determines a quality index Q based upon the electrical parameters for each of the battery cells 115 and the temperature of the battery pack 110 that are captured at the time when one of the aforementioned conditions (302, 304, 306) triggers the battery pack controller 104 to perform the battery assessment for potential use by the cell charge balancing routine 320 (308). The new quality index $Q_{new}$ may be determined in accordance with the following equation.

$$Q_{new} = Q_{cellV} * \text{Max}(Q_{oct}, Q_{low\ curr\ t}, Q_{cc}) \quad [1]$$

wherein:
$Q_{new}$ represents a quality index associated with the new event,
$Q_{cellV}$ represents a cell voltage quality index,
$Q_{oct}$ represents an open circuit time quality index,
$Q_{low\ curr\ t}$ represents a low current quality index, and
$Q_{cc}$ represents a charge complete event quality index.

Figure 41:
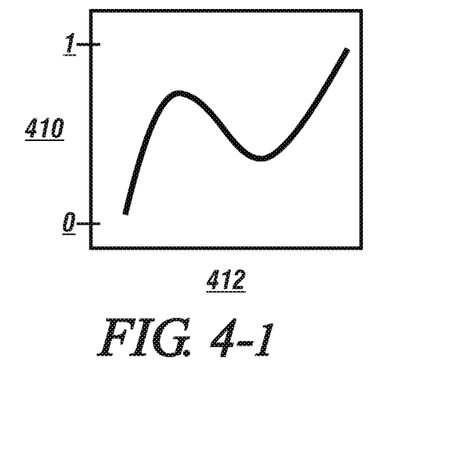

The cell voltage quality index, $Q_{cellV}$, is determined in relation to the cell voltage and the battery temperature, and is an indication of several factors including but not limited to flatness of the OCV/SOC relationship, areas of high voltage hysteresis, and difference from the balance point target which can induce error in balancing calculations from capacity measurement error. Some of the influences on quality listed can be predetermined and defined as a fixed calibration, while others may be empirically determined in real-time in the battery pack controller 104 that is described with reference to FIG. 1. FIG. 4-1 graphically shows a relationship between the cell voltage quality index, $Q_{cellV}$ 410 and the voltage level 412, including a low voltage $V_{low}$ and a target voltage $V_{tgt}$, at a known battery temperature.

Figure 42:
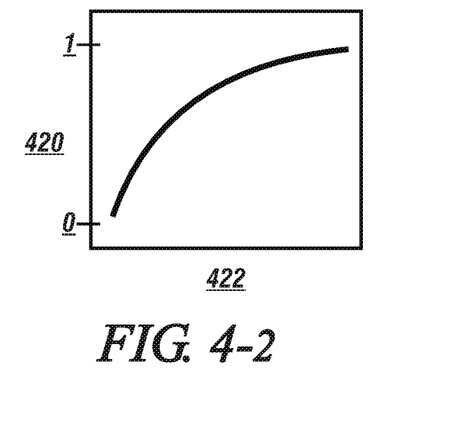

The open circuit time quality index $Q_{oct}$ is determined in relation to the open circuit time and the battery temperature, and is an indication of the elapsed period of time at which the battery pack 110 has been maintained in an open circuit state prior to capturing the electrical parameters for each of the battery cells 115 and the temperature of the battery pack 110, i.e., has been rested. The open circuit time quality index $Q_{oct}$ increases with an increase in the elapsed period of time because the accuracy of the electrical parameters for each of the battery cells 115 increases over time. FIG. 4-2 graphically shows a relationship between the open circuit time quality index $Q_{oct}$ 420 and time at the open circuit condition 422, at a known battery temperature.

Figure 43:
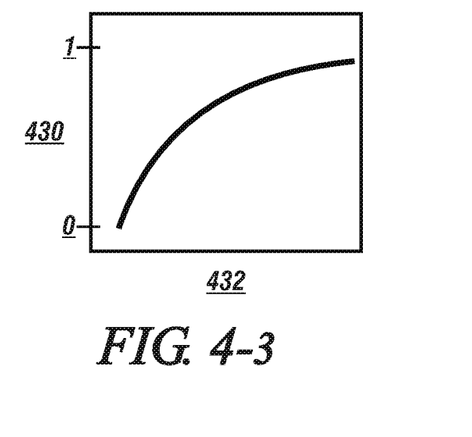

The low current quality index $Q_{low\ curr\ t}$ is determined in relation to the low current time and the battery temperature, and is an indication of the elapsed period of time at which the battery pack 110 has been maintained in low current state prior to capturing the electrical parameters for each of the battery cells 115 and the temperature of the battery pack 110. The low current quality index $Q_{low\ curr\ t}$ increases with an increase in the elapsed period of time because the accuracy of the electrical parameters for each of the battery cells 115 increases over time. FIG. 4-3 graphically shows a relationship between the low current quality index $Q_{low\ curr\ t}$ 430 and time at the low current condition 432, at a known battery temperature.

Figure 44:
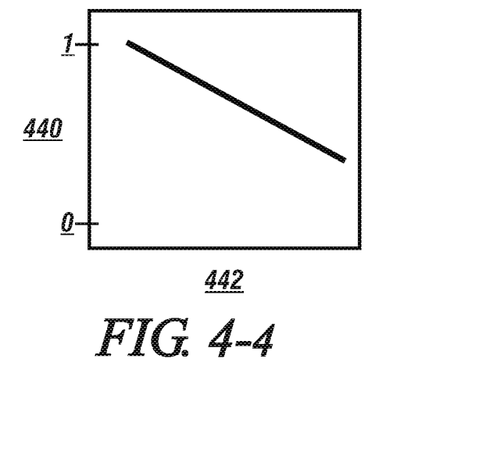

The charge complete event quality index $Q_{cc}$ is determined in relation to the occurrence of a charge complete event, and is an indication of long periods of unidirectional current going into the battery pack 110. The charge complete event quality index $Q_{cc}$ increases with a decrease in the charge current or power provided via charger 52 because the accuracy of the electrical parameters for each of the battery cells 115 decreases therewith. FIG. 4-4 graphically shows a relationship between the charge complete event index $Q_{cc}$ 440 and charge power 442 that is provided via charger 52, at a known battery temperature.

Figure 45:
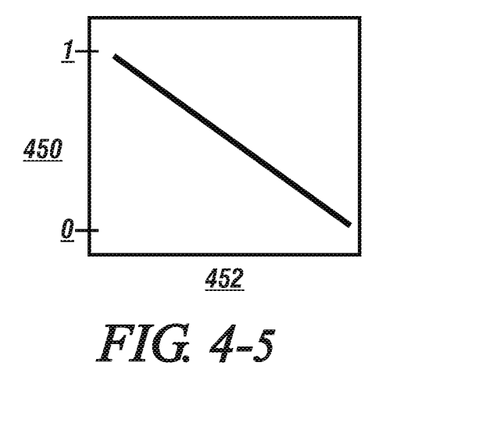

An existing quality index $Q_{old}$ represents a quality index that was determined at a previous timepoint in accordance with the relationship described with reference to Eq. 1, when one of the aforementioned conditions (302, 304, 306) triggers the electrical charging system 50 to perform a battery assessment for use by the cell charge balancing routine 320 (310). The existing quality index $Q_{old}$ is initially set to zero, and is reset to zero when the cell balancing operation is completed. The existing quality index $Q_{old}$ is determined by subjecting a previously determined quality index $Q_{new}(t-1)$ to a decaying factor $Q_{decay}$. The decaying factor $Q_{decay}$ ranges in value between 1 and 0, and decreases in relation to elapsed time since the previously determined quality index $Q_{new}$ was determined. FIG. 4-5 graphically shows a relationship between the decaying factor $Q_{decay}$ 450 and time 452. The decaying factor $Q_{decay}$ is an indication of occurrence of self-discharge in individual battery cells and other factors. The existing quality index $Q_{old}$ is determined in accordance with the following equation:

$$Q_{old}=Q_{new}(t-1)*Q_{decay} \quad [2]$$

wherein $Q_{new}(t-1)$ represents the previously determined quality index.

Referring again to FIG. 3, the electric parameters determined for each of the battery cells 115 may be evaluated to determine a cell spread based upon the data captured at the time of the battery assessment (309). The cell spread is a measure of variation in states of charge between the plurality of battery cells 115. In one embodiment, the cell spread is associated with the states of charge of the plurality of battery cells 115, may be determined as a difference between a maximum state of charge associated with the states of charge of the plurality of battery cells 115 and a minimum state of charge associated with the states of charge of the plurality of battery cells 115.

Figure 46:
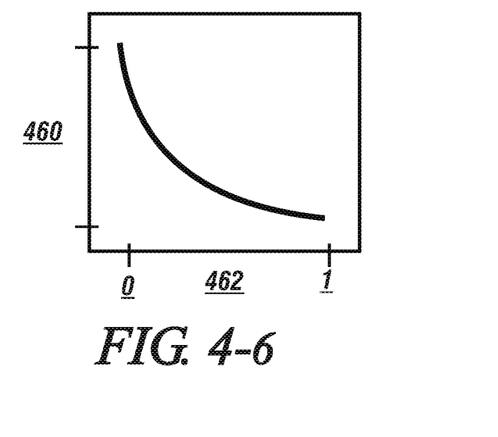

FIG. 4-6 graphically shows a relationship between the cell spread threshold 460 and the new quality index $Q_{new}$ 462. The cell spread threshold 460 increases with a decrease in the new quality index $Q_{new}$ 462, with the relationship between the new quality index $Q_{new}$ 462 and the cell spread threshold 460 being a quadratic relationship. In operation, the new quality index $Q_{new}$ 462 may be dynamically determined in accordance with Eq. 1, above, and the cell spread is also determined based upon the same data. The new quality index $Q_{new}$ 462 is used to determine the cell spread threshold 460 based upon the relationship described in FIG. 4-6. As such, the cell spread threshold 460 is dynamically determined.

Referring again to FIG. 3, the new quality index $Q_{new}$ is compared with the previously determined quality index $Q_{old}$, and the cell spread is compared with the dynamically determined cell spread threshold 460 (312). When the new quality index $Q_{new}$ is less than or equal to the previously determined quality index $Q_{old}$ or when the cell spread is less than the cell spread threshold (312)(0), it is an indication that the most recently performed battery assessment lacks sufficient indices of quality to warrant re-evaluating states of charge of the battery cells 115 of the battery system 100. When the new quality index $Q_{new}$ is greater than the previously determined quality index $Q_{old}$ and when the cell spread is greater than the cell spread threshold (312)(1), action is taken to re-evaluate the states of charge of the battery cells 115 of the battery system 100 based upon the most recently performed battery assessment. This includes determining a quantity of electrical energy (in Amp-hours) that needs to be depleted or added to each of the battery cells 115 of the battery system 100 so that the battery sections 114 are balanced with regard to the states of charge (314).

Stated differently, the cell spread threshold 460 is determined from the relationship shown with reference to FIG. 4-6. When the cell spread is greater than the cell spread threshold and the new quality index $Q_{new}$ is greater than the old quality index $Q_{old}$, or when there is no update in progress, i.e., there is no old quality index $Q_{old}$, the cell balancing is achieved with the data used to determine the new quality index $Q_{new}$. When the cell spread is less than the cell spread threshold and/or the new quality index $Q_{new}$ is less than the old quality index $Q_{old}$, the data used to determine the new quality index $Q_{new}$ is discarded, and the cell balancing is achieved with the data associated with the old quality index $Q_{old}$, or the cell charge balancing is delayed until new data is obtained.

The cell charge balancing routine 320 executes employing the states of charge of the battery cells 115 of the battery system 100 that were determined at the time when the previously determined quality index $Q_{old}$ was determined (316).

The concepts described herein provide a dynamic balancing threshold based on the quality of the charge SOC spread, as indicated by the cell spread threshold 460 determined from the relationship shown with reference to FIG. 4-6. The concept is to prevent operation that results in cell balancing that may cause an increase in the cell spread, which may otherwise occur when the new SOC spread is lower than the existing or old SOC spread. By way of example, when there is a poor quality update under a condition that includes a small SOC spread, cell balancing will not be changed in a manner that may increase cell SOC imbalance. However, when the cell SOC spread is relatively high, lower quality updates may be allowable because the error will be less than the magnitude of the calculated SOC spread at the time of the $Q_{new}$ calculation.

Execution of the cell charge balancing routine 320 includes controlling the cell balancing system 120 to balance the battery cells 115 of the battery pack 110 by charging individual ones of the battery cells 115 and/or discharging individual ones of the battery cells 115, such that each of the battery cells 115 has the same or similar quantum of energy stored therein, as indicated by a state of charge measurement or a voltage measurement.

The cell charge balancing routine 320 may continue in the present state until the cells 115 are completely balanced (322), or until the battery assessment is updated and the cell charge balancing routine 320 is restarted employing the updated battery assessment (324).

Overall, the cell charge balancing control routine 300 monitors, at a first timepoint, inputs from the sensors 106 associated with each of the battery cells 115 to measure an electrical parameter thereof, e.g., voltage, determines charge parameters for each of the battery cells 115 based upon the electrical parameter, and determines a quality index at the first timepoint for the charge parameters.

Thus, the concepts described herein include the battery controller in communication with the plurality of sensors and the cell charge balancing system, wherein the battery controller includes an instruction set that is executable to determine, at a first timepoint, a first plurality of the electrical parameters associated with the plurality of cells, determine a plurality of first charge parameters associated with the plurality of cells based upon the respective first plurality of electrical parameters, and determine a first quality index based upon the plurality of first charge parameters. The instruction set is further executable to determine, at a second timepoint subsequent to the first timepoint, a second plurality of the electrical parameters associated with the plurality of cells, determine a plurality of second charge parameters associated with the plurality of cells based upon the respective second plurality of electrical parameters, and determine a second quality index based upon the plurality of second charge parameters. The first and second quality indices are compared. A cell charge balancing routine is executed to control the balancing system based upon the first quality index when the first quality index is greater than the second quality index, and control the cell charge balancing system based upon the second quality index when the first quality index is less than the second quality index.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A system comprising:
    a battery including a plurality of cells;
    a plurality of sensors coupled to the plurality of cells, wherein the plurality of sensors are arranged to determine electrical parameters associated with the plurality of cells;
    a cell charge balancing system coupled to the plurality of cells, wherein the cell charge balancing system is arranged to control an amount of energy stored in each of the plurality of cells; and
    a battery controller in communication with the plurality of sensors and the cell charge balancing system, the battery controller including an instruction set, the instruction set executable to:
        determine, at a first timepoint, a first plurality of the electrical parameters associated with respective ones of the plurality of cells,
        determine a plurality of first charge parameters associated with the plurality of cells based upon the respective first plurality of electrical parameters,
        determine a first quality index based upon the plurality of first charge parameters,
        determine, at a second timepoint subsequent to the first timepoint, a second plurality of the electrical parameters associated with respective ones of the plurality of cells,
        determine a plurality of second charge parameters associated with the plurality of cells based upon the respective second plurality of electrical parameters,
        determine a second quality index based upon the plurality of second charge parameters,
        compare the first and second quality indices,
        execute a cell charge balancing routine to control the cell charge balancing system based upon the first quality index when the first quality index is greater than the second quality index, and
        execute the cell charge balancing routine to control the cell charge balancing system based upon the second quality index when the first quality index is less than the second quality index; wherein the instruction set executable to determine the first quality index based upon the plurality of first charge parameters comprises the instruction set executable to determine a first open circuit time quality index associated with the first plurality of the electrical parameters during a first rested state, a first low current quality index associated with the first plurality of the electrical parameters during the low current state, and a first charge complete event quality index associated with the first plurality of the electrical parameters at the charge complete event; and select a first maximum of the first open circuit time quality index, the first low current quality index, and the first charge complete event quality index as the first quality index.

2. The system of claim 1, wherein the instruction set executable to determine, at the first timepoint, the first plurality of the electrical parameters associated with the respective ones of the plurality of cells comprises the instruction set executable to determine the first plurality of the electrical parameters during one of a rested state, a low current state, or at a charge complete condition at the first timepoint.

3. The system of claim 1, wherein the instruction set executable to determine, at the second timepoint subsequent to the first timepoint, the second plurality of the electric parameters associated with the respective ones of the plurality of cells comprises the instruction set executable to determine the second plurality of the electrical parameters during one of a rested state, a low current state, or at a charge complete condition at the second timepoint.

4. The system of claim 1, wherein the instruction set executable to determine the second quality index based upon the plurality of second charge parameters comprises the instruction set executable to determine an open circuit time quality index associated with the second plurality of the electrical parameters during a rested state, a low current quality index associated with the second plurality of the electrical parameters during the low current state, and a charge complete event quality index associated with the second plurality of the electrical parameters at the charge complete event; and select a maximum of the open circuit time quality index, the low current quality index, and the charge complete event quality index as the second quality index.

5. The system of claim 1, wherein the instruction set executable to compare the first and second quality indices further comprises the instruction set executable to subject the first quality index subject to a decay parameter based upon a difference between the first and second timepoints.

6. The system of claim 1, wherein the instruction set executable to execute the cell charge balancing routine to control the balancing system comprises the instruction set executable to selectively charge individual ones of the cells, discharge individual ones of the cells, and redistribute energy between individual ones of the cells to achieve equivalent charge balance points in all of the cells.

7. The system of claim 6, wherein the equivalent charge balance points comprise a state of charge.

8. The system of claim 6, wherein the equivalent charge balance points comprise a voltage level.

9. A method for charge balancing a multi-cell battery, comprising:
   determining, at a first timepoint, a first plurality of electrical parameters associated with respective ones of a plurality of cells of the multi-cell battery;
   determining a plurality of first charge parameters associated with the plurality of cells based upon the first plurality of electrical parameters;
   determining a first quality index based upon the plurality of first charge parameters;
   determining, at a second timepoint subsequent to the first timepoint, a respective second plurality of the electrical parameters associated with the respective ones of the plurality of cells of the multi-cell battery;
   determining a plurality of second charge parameters associated with the plurality of cells based upon the respective second plurality of electrical parameters;
   determining a second quality index based upon the plurality of second charge parameters;
   comparing the first and second quality indices;
   executing a cell charge balancing routine to control a balancing system based upon the first quality index when the first quality index is greater than the second quality index; and
   executing a cell charge balancing routine to control the balancing system based upon the second quality index when the first quality index is less than the second quality index;
   determining the first quality index based upon the plurality of first charge parameters comprises determining a first open circuit time quality index associated with the first plurality of the electrical parameters during a first rested state, a first low current quality index associated with the first plurality of the electrical parameters during a first low current state, and a first charge complete event quality index associated with the first plurality of the electrical parameters at a first charge complete event; and selecting a first maximum of the first open circuit time quality index, the first low current quality index, and the first charge complete event quality index as the first quality index; and
   determining the second quality index based upon the plurality of second charge parameters comprises determining a second open circuit time quality index associated with the second plurality of the electrical parameters during a second rested state, a second low current quality index associated with the second plurality of the electrical parameters during a second low current state, and a second charge complete event quality index associated with the second plurality of the electrical parameters at a second charge complete event; and selecting a second maximum of the second open circuit time quality index, the second low current quality index, and the second charge complete event quality index as the second quality index.

10. The system of claim 9, wherein the instruction set executable to execute the cell charge balancing routine to control the balancing system comprises the instruction set executable to selectively charge individual ones of the cells, discharge individual ones of the cells, and redistribute energy between individual ones of the cells to achieve equivalent charge balance points in all of the cells.

11. The system of claim 10, wherein the equivalent charge balance points comprise one of a state of charge or a voltage level.

12. A system comprising:
    a battery including a plurality of cells;
    a plurality of sensors coupled to the plurality of cells, wherein each of the sensors is arranged to determine electrical parameters associated with a respective one of the plurality of cells;
    a cell charge balancing system coupled to the plurality of cells, wherein the cell charge balancing system is arranged to control an amount of energy stored in each of the plurality of cells; and
    a battery controller in communication with the plurality of sensors and the cell charge balancing system, the battery controller including an instruction set, the instruction set executable to:
      determine, at a first timepoint, a first quality index based upon a plurality of first charge parameters associated with the plurality of cells that are based upon a respective first plurality of the electrical parameters,
      determine, at a second timepoint subsequent to the first timepoint, a second quality index based upon a plurality of second charge parameters associated with the plurality of cells that are based upon a respective second plurality of the electrical parameters,
      determine a cell spread based upon the plurality of second charge parameters associated with the plurality of cells that are based upon the second plurality of the electrical parameters;
      determine a cell spread threshold based upon the second quality index; and
      execute a cell charge balancing routine to control the cell charge balancing system based upon the second quality index only when: the second quality index is greater than the first quality index, and the cell spread is greater than the cell spread threshold;
      wherein the instruction set executable to determine the second quality index based upon the plurality of second charge parameters comprises the instruction set executable to determine an open circuit time quality index associated with the second plurality of the electrical parameters during a rested state, a low current quality index associated with the second plurality of the electrical parameters during the low current state, and a charge complete event quality index associated with the second plurality of the electrical parameters at the charge complete event; and select a maximum of the open circuit time quality index, the low current quality index, and the charge complete event quality index as the second quality index.

13. The system of claim 12, further comprising the instruction set executable to execute the cell charge balancing routine to control the cell charge balancing system based upon the first quality index when the second quality index is less than the first quality index.

14. The system of claim 12, further comprising the instruction set executable to execute the cell charge balancing routine to control the cell charge balancing system based upon the first quality index when the cell spread is less than the cell spread threshold.

15. The system of claim 12, further comprising the instruction set executable to determine, at the first timepoint, a first plurality of the electrical parameters associated with respective ones of the plurality of cells, and determine the plurality of first charge parameters associated with the plurality of cells based upon the respective first plurality of electrical parameters.

16. The system of claim 12, wherein the instruction set executable to execute the cell charge balancing routine to control the cell charge balancing system comprises the instruction set executable to selectively charge individual ones of the cells, discharge individual ones of the cells, and redistribute energy between individual ones of the cells to achieve equivalent charge balance points in all of the cells.

17. The system of claim 16, wherein the equivalent charge balance points comprise one of a state of charge or a voltage level.

* * * * *